United States Patent [19]

Miller

[11] 4,267,060
[45] * May 12, 1981

[54] TRAVELLING SHEET, FLAT-BED VACUUM FILTER AND METHOD

[76] Inventor: Peter A. Miller, Mozartstrasse 16, D-6370 Oberursel, Fed. Rep. of Germany

[*] Notice: The portion of the term of this patent subsequent to Nov. 11, 1997, has been disclaimed.

[21] Appl. No.: 123,101

[22] Filed: Feb. 19, 1980

Related U.S. Application Data

[63] Continuation-in-part of Ser. No. 854,192, Nov. 23, 1977, Pat. No. 4,233,157, which is a continuation-in-part of Ser. No. 466,171, Apr. 10, 1975, abandoned.

[51] Int. Cl.³ .................... B01D 29/02; B01D 29/36
[52] U.S. Cl. .................................. 210/741; 210/771; 210/791; 210/805; 210/87; 210/90; 210/103; 210/120; 210/196; 210/387; 210/406
[58] Field of Search ............... 210/87, 90, 95, 103, 210/106, 120, 138, 193, 195.1, 196, 216, 218, 387, 400, 401, 406, 416 R, 445, 446, 741, 771, 791, 805

[56] References Cited

U.S. PATENT DOCUMENTS

| | | | |
|---|---|---|---|
| 1,793,449 | 2/1931 | Bassler | 210/400 |
| 1,881,404 | 10/1932 | Hadley | 210/400 X |
| 2,528,642 | 11/1950 | Cover | 210/406 X |
| 2,867,326 | 1/1959 | Hirs | 210/387 X |
| 2,896,787 | 7/1959 | Roman | 210/406 |
| 3,091,336 | 5/1963 | Hirs | 210/387 X |
| 3,104,223 | 9/1963 | Kasuya | 210/406 X |
| 3,199,677 | 8/1965 | Schneider | 210/193 X |
| 3,305,094 | 2/1967 | Casson | 210/387 X |
| 3,690,466 | 9/1972 | Lee et al. | 210/387 |
| 3,731,808 | 5/1973 | Rickert | 210/387 X |
| 4,201,675 | 5/1980 | Damerau | 210/387 |

FOREIGN PATENT DOCUMENTS

| | | | |
|---|---|---|---|
| 2115781 | 10/1972 | Fed. Rep. of Germany | 210/387 |
| 2306880 | 8/1974 | Fed. Rep. of Germany | 210/387 |
| 52-29674 | 3/1977 | Japan | 210/387 |
| 1146170 | 3/1969 | United Kingdom | 210/387 |

*Primary Examiner*—Robert H. Spitzer
*Attorney, Agent, or Firm*—Frishauf, Holtz, Goodman & Woodward

[57] ABSTRACT

To seal the top cover of a vacuum travelling web filter, the top cover is lowered, by gravity, with a depending rim fitting against an upstanding rim of a filtrate chamber pan; the contaminant chamber above the filter web is closed off, and supply of filtrate is inhibited. Upon starting of the pump, a vacuum will result within the two chambers, drawing the cover tightly against the filtrate pan and, when a sufficient vacuum has been reached indicative of sealing engagement, supply of contaminant can be opened to draw contaminant into the upper chamber. As the filter cake builds up, further change in pressure in the contaminant chamber will result which, when a predetermined operating pressure level is reached, causes interruption of supply of contaminated fluid, and opening of an air vent valve to dry the resulting filter cake. Sealing fluid can be introduced between the engaging rims of the cover and the filtrate holding pan, between which rims the filter web is interposed, for example by introducing filtered fluid into a groove between the rims, or by introducing an inert gas. Preferably, filtered fluid is used which will be drawn back to the pump upon pump operation. A bypass line of filtered fluid to the pump prevents dry running thereof.

15 Claims, 2 Drawing Figures

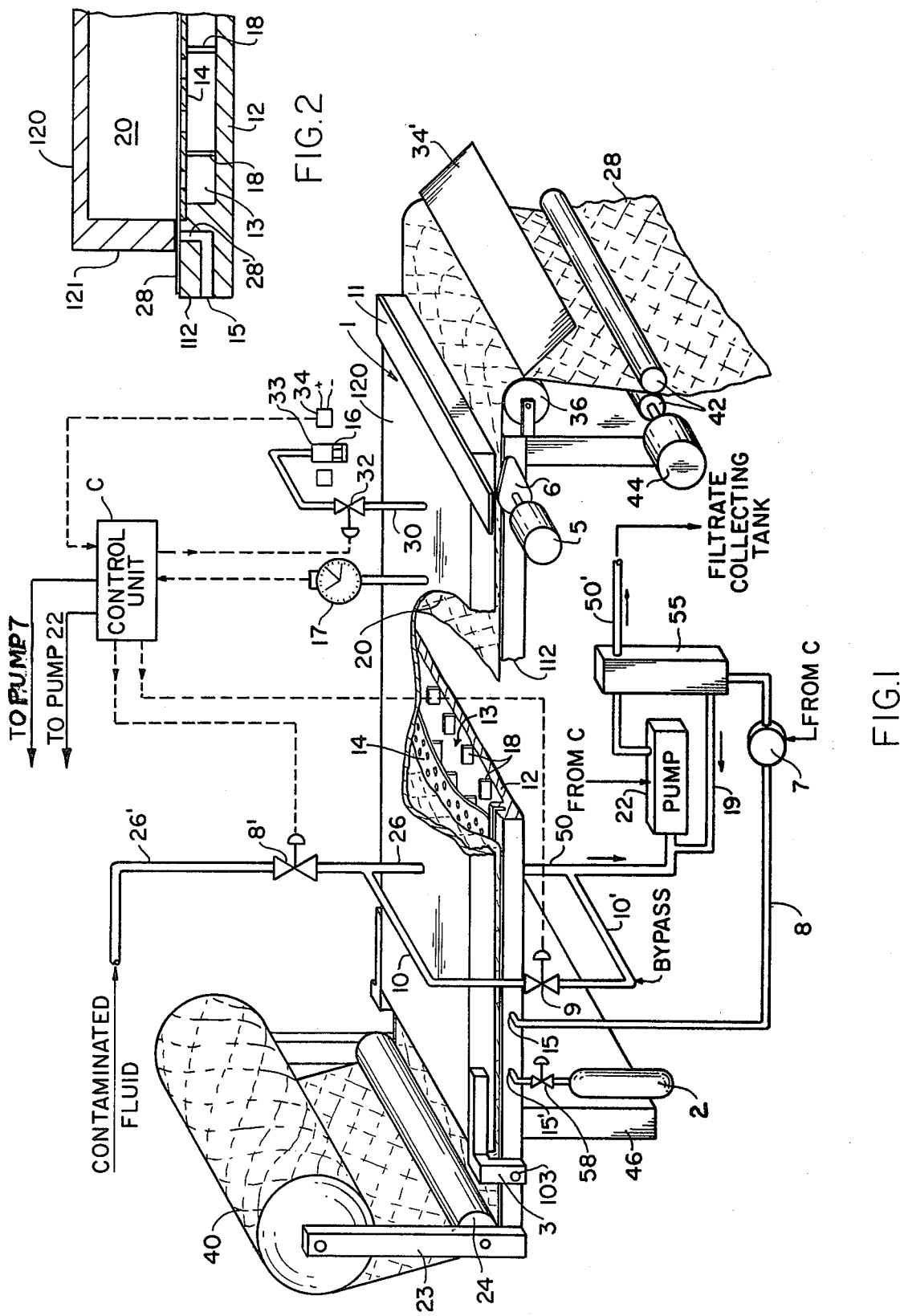

TRAVELLING SHEET, FLAT-BED VACUUM FILTER AND METHOD

The present application is a continuation-in-part of my application Ser. No. 854,192, filed Nov. 23, 1977, now U.S. Pat. No. 4,233,157, issued Nov. 11, 1980 which is a continuation-in-part of my application Ser. No. 446,171, filed Apr. 10, 1975, abandoned.

CROSS REFERENCE TO RELATED PATENTS

U.S. Pat. No. 3,690,466, Lee; U.S. Pat. No. 3,731,808, Rickert.

The present invention relates to a flat-bed filter, and a filtration method, in which a filter chamber is provided over which a filter web can be transported in steps. The filter chamber is thus subdivided by the web into an upper contaminant chamber and a lower filtrate chamber, the filter web being guided between the chambers to seal them off with respect to each other. A pump is provided in the filtrate removal line.

BACKGROUND AND PRIOR ART

Various types of traveling web filters are known; U.S. Pat. No. 3,690,466 (Lee) and U.S. Pat. No. 3,731,808 (Rickert) describe travelling web filters in which filtration is aided by generating an underpressure, with respect to atmospheric, in the filtrate chamber. The Rickert structure U.S. Pat. No. 3,731,808) subdivides the filter into a contaminant chamber and a filtrate chamber. In order to ensure that outside ambient air is excluded and does not penetrate into the filtrate chamber and into the contaminant chamber, respectively, which might interfere with the filtration process, complex sealing arrangements are used in those regions in which the filter web passes into the actual filter structure in order to define the respective chambers. These mechanical seals are effected by pressure arrangements, typically hydraulically operated pressure elements sealingly pressed against the filter web by hydraulic cylinders. The vacuum filter in accordance with the Lee U.S. Pat. No. (3,690,466) does not utilize a contaminant chamber; rather, the liquid to be filtered is maintained in form of a pool above the filter band or web. Such an arrangement cannot be used to employ the pressure above the filter web in order to control a filtration process.

THE INVENTION

It is an object to construct a sturdy and simple travelling web filter in which filtrate to be cleaned, that is, contaminated liquid or the already filtered liquid, that is, the filtrate itself, is prevented from escaping by simple means, which is easily constructed and does not require complex sealing arrangements in order to seal the respective filter chambers from each other; further, the filtration process should be capable of being easily controlled and the residual substance from filtration should be dried in a simple manner. —Briefly, the structure provides two chambers, one on top of each other, subdivided by the travelling filter web. The upper filtrate chamber is closed off by a cover element which has edges fitting against the filter web which is located on a support. Only fixed depending edges of the cover engage the web of the filter medium, and a seal is effected by connecting a vacuum pump to the filtrate chamber below the contaminant chamber, so that the ambient atmospheric pressure acting on the outside of the cover will press the cover against the filter web and against the substrate or support. The vacuum generated is strong enough to effect the seal. Continued operation of the pump will also suck the material to be filtered through the filter web, and thus contributes to movement of the contaminated liquid to be filtered through the filter web.

The filter web is supported on a filter plate which is formed with support elements. The filter plate itself, preferably, is a perforated sheet metal element which is spaced from a bottom support pan by the support elements.

Control of the liquid to be filtered is simply effected by providing a contaminant liquid supply to the cover of the filter apparatus, and a valve located in the supply which responds when a specific underpressure or vacuum in the contaminant chamber has been generated.

A further line is provided in the cover through which air or a gas can be supplied in order to permit drying of the filter cake which collects on the web. The quantity of gas or air which passes through this line can be used to control the process.

In accordance with a feature of the invention, the vacuum pump is a displacement pump, the pressure side of which is connected to a filtrate tank in such a manner that a portion of the filtrate is continuously supplied to the pump suction side by gravity.

The filtration process can be controlled, and pressure differentials between the contaminant chamber and the filtrate chamber additionally controlled by providing a line between the contaminant chamber and the filtrate chamber in which a valve is located which responds when a predetermined underpressure or vacuum in the contaminant chamber exists, in order to provide for at least partial pressure equalization.

Ambient air can be excluded during the filtration process, so that ambient air will not influence, for example, liquids to be filtered which are contaminated by ambient air by introducing a neutral protective gas in the region in which the edges of the cover bear on the filter web to effect the seal so that, if any leakage should exist, only the protective gas could penetrate into the filtration chamber and/or into the contaminant chamber respectively. Preferably, the gas is introduced by a circumferential groove which is formed in the filter plate and located beneath the depending sealing rim of the filter cover.

Supply of protective gas can be decreased or entirely eliminated by replacing the protective gas by recycled filtrate, the filtrate being taken from a filtrate tank.

DRAWINGS, ILLUSTRATING AN EXAMPLE:

FIG. 1 is a general highly schematic part-sectional perspective view of the system in accordance with the invention, and used in connection with the explanation of the invention; and FIG. 2 is a part-sectional vertical view illustrating sealing connection of the cover with introduction of a sealing fluid.

A frame structure 46 supports the filter chamber unit 1. Filter chamber unit 1 has a lower support plate 12 above which the filtrate chamber 13 is formed. A sheet metal plate 14, which is perforated in the region where filtration is to take place subdivides the apparatus and separates the filtrate chamber 13 from the upper contaminant chamber 20 which is closed off against ambient atmosphere by a cover 120. Support brackets 23 secured to the frame 46 support a supply roll 40 on which a filter web 28 is rolled. The supply roll 40 for the filter web 28 supplies the filter web 28 over a deflection roller 24 which guides the web 28 between the filter support plate 12 and the cover 120 and over the perforated plate 14, thereby defining the contaminant chamber and the filtrate chamber. After passing through the filter apparatus 1, the web 28 is guided over a deflection roller 36 in the direction of two take-up rollers 42. A doctor blade 34' for filter cake is located in the immediate vicinity of the deflection roller 36. The doctor blade 34' operates in form of a scraper to scrape off filter cake from the web 28. The take-up rollers 42 are driven from a take-up motor 44 which is located beneath the filter plate 12 and secured to the frame 46.

Contaminated liquid to be filtered, supplied from a contaminant tank (not shown) is guided over a supply line 26' to a valve 8' and continues over line 26 through the top cover 120 into the contaminant chamber 20. The contaminated liquid will distribute uniformly over the filter web 28, supported on the perforated plate 14. Liquid can be sucked through the filter web 28 on the support plate 14 by a vacuum pump 22 which is in communication with the filtrate chamber 13 by a duct 50 connected through the filter plate 12. The pump is a multi-purpose pump, as will appear.

The filter support plate 12 is formed with an upstanding edge portion 112 to define the filtrate chamber between the bottom support plate 12 and the edge portion 112. Support elements 18 are positioned above the support plate to support the perforated plate 14 at the level of the upper edge of the rim or edge 112. The plate 14 preferably is a perforated sheet metal plate and fits flush with the circumferential edges or rims of the portion 112 of the filtrate chamber 13. The edge portions of the plate 14 are solid and not perforated.

The filter cover 120 is connected to the apparatus by hinge arms 3 which are pivoted at 103 to a suitable structural frame element of the frame 46. The cover 120 thus can be tipped upwardly. A cam disk 6 is located at a region remote from the pivot points 103 which can engage a laterally projecting strip 11 projecting from the top of cover 120. Cam disk 6 can be manually operated or, in a preferred form, is driven by a motor 5 when motor 5 is energized.

The filter cover 120 is connected to an electrical-pneumatic transducer, in the form of a pressure gauge 17 with electrical contacts which change state, for example to energize a control line when a predetermined pressure level or, rather, vacuum within the chamber 20 is sensed. The transducer also provides visual read-out, and thus can be in form of a contact manometer. The transducer 17 thus determines and indicates vacuum within the contaminant chamber 20. The vacuum in chamber 20 is used to control valves 8', 9 and 32. The contact manometer 17 can provide signals to a control unit C when certain predetermined pressure relationships within the chamber 20 exist, and control unit C then effects the requisite operation of the valves, as will appear. Valve 8' is located in the supply line 26', 26 for contaminated fluid. Valve 8' is normally closed; when a predetermined vacuum within chamber 20 is sensed, the valve 8' is controlled to open and, thereafter, again to close in order to permit a predetermined quantity of contaminated fluid to pass into the chamber 20. Valve 9 is located in a bypass line 10, 10' between the contaminated fluid supply line 26 and the filtrate output line 50, in order to permit pressure equalization between the contaminant chamber 20 and the filtrate chamber 13 when a predetermined pressure differential exists, that is, when the vacuum within chamber 20 exceeds a certain value. Valve 32 is located in an inlet air line 30 connected to the filtrate cover 120. Valve 32 opens automatically when a predetermined pressure drop in the contaminant chamber 20 occurs in order to break the vacuum within the apparatus 10. Valve 32 is connected to a sensor 33 which determines the flow of air or gas through line 30. Sensor 33 preferably includes a glass cylinder or the like in which a movable element 16 is placed. A light gate 34 is provided, consisting of a lamp shining a beam of light across the glass cylinder, which is received by a photo transducer, for example a photo-responsive diode 34 or the like. Upon substantial airflow through line 30, the element 16 is raised and will interrupt the beam of light to the photo transducer 34. The sensor 33 thus can be used in order to control drying of the filter cake which will form on the filter web 28 within the filter chamber 1. If, after venting the filter chamber, air is sucked through the filter cake and into the contaminant chamber, a pressure drop will occur due to the presence of filter cake on the web 28, which will raise the element 16 within the sensor 33 until it eventually interrupts the light beam of the light gate 34. This causes a signal to be received from the light gate 34 which indicates that the drying of the filter cake has terminated. Response of the sensor 16 can be indicated by a suitable indicator connected to or forming part of the control unit C.

Suction-and-vacuum pump 22 is connected to a tank 55 which collects the filtered liquid, that is, the filtrate. A suction line 19 is connected from the filtrate tank 55 to the suction side of pump 22 so that the pump 22 will be continuously "primed" and be supplied with filtrate. The filtrate tank 55 is additionally connected through a line 8 with grooves 28' formed in the upper edge portion 112 of the filter support 12. A pump 7 is provided connected in line 8 and controlled by control unit C. Groove 28' is connected by a duct or line 15 to the line 8. Return filtrate can be used to additionally seal the depending edge 121 of the cover 120 against the web 28 by providing a liquid film between the depending edge or rim 121 of the cover 120 and the rim 112 of the filter support plate 12. In addition to, or instead of, supply of filtrate to groove 28' and to prevent ingress of air upon generation of a vacuum in chamber 20, a protective gas can be supplied to the line 15. A supply tank 2, supplies such a protective gas which, for example, is inert with respect to the substances of the filtrate. Tank 2 is connected to another supply opening 15' similar to the line 15 and communicating with groove 28' through a valve 58 which, for example, can be manually controlled or, if desired, can be controlled from control unit C.

Introducing either filtrate and/or protective gas into groove 28' ensures that filtration of liquids which are sensitive with respect to ambient is not impeded or disturbed.

Introduction of filtrate also improves the seal.

OPERATION

The rim portions 121 of the filter cover 120 have been lowered against the rim portions 112 of the filter support pan 12, and are sealingly engaged, with the web 28 interposed. The portion of the web 28' within the filter chamber 20 is supported on the perforated plate 14.

Valves 8', 32, 9 and 58 are closed. Pump 7 is OFF. Pump 22 is then started.

Initially, pump 22 will evacuate a major portion of air or gas within the contaminant chamber 20 and the filter chamber 13, that is, the space beneath the cover 120. When a predetermined vacuum is sensed or determined by the contact manometer 17, valve 8' will be opened and, upon continued operation of pump 22, contaminated fluid will be supplied over supply line 26', 26 from the contaminant tank (not shown) into the contaminant chamber 20. It will distribute itself over the paper filter web 28. No specific mechanical sealing or pressing arrangements to press the cover 120 on the support plate 12 is needed, since the vacuum generated by vacuum pump 22 is sufficient so that the ambient atmospheric pressure will press the cover 120 with its rim portions 121 on the rim portions 112 of the filter support plate 12, the web 28 being interposed and effecting a seal. Upon further operation of the pump, a mixture of air and filtrate will be sucked through the filter web 28 by the pump 22. The filtrate will be supplied through line 50 to the pump 22 and then be supplied further, after tank 55 has been filled, through an overflow line 50' to a filtrate collecting tank (not shown). The tank 55 between the outlet connection from pump 22 and line 50' permits recycling of filtrate, that is, of cleaned and filtered substance by pump 7, when started, and lines 8 and duct 15 to groove 28'. Introduction of fluid into groove 28' improves the seal at the rim portions 112, 121 and additionally ensures that any leakage of air will be excluded, while leakage inwardly of filtrate introduced through line 8 and groove 28' will continue to introduce filtered liquid to the suction side of the pump 22.

During the filtering process, mud, sludge, and other dispersed solid particles within the liquid to be filtered will collect in the form of a filter cake on the filter web 28. When the rising pressure in the contaminant chamber 20 reaches a set maximum value, the contact manometer 17 provides a signal to control unit C which in turn closes valve 8' and opens valve 32. Upon closing of valve 8', further supply of contaminated fluid is inhibited. Pump 22 can continue to operate, however, and is prevented from running dry by recirculated filtrate through the pump 7, and lines 8, 15, and groove 28'.

Opening of valve 32 vents the contaminant chamber 20 to the surrounding atmosphere. Pump 22 thus will suck air through line 30 and valve 32, and hence through the filter cake and the paper web 28. The wet filter cake is comparatively air-pervious. Supply of air will cause drying of the filter cake and then raise the element 16 to interrupt the light path of the gate 34. Sensor 33, thus, provides an output signal which will be representative of the dry-condition of the filter cake. When this output signal is obtained, and transmitted to control unit C, control unit C will respond to control opening of valve 9 in the bypass line 10, 10' to effect pressure equalization between the contaminant chamber 20 and the filtrate chamber 13. Motor 5 can, additionally, be energized to operate—for example after a short time delay to permit complete pressure equalization—and to raise the cover 120. Cover 120 is then lifted about the pivot axis 103, releasing the web 28. The take-up motor 44 can then be operated to cause the rollers 42 to draw the paper web 28 slowly out of the apparatus 1. At the deflection of the filter web 28 from horizontal into vertical condition, the filter cake is scraped off by the scraper 34', located at an inclination with respect to the direction of transport of the web 28. The filter cake can then be conducted to a suitable conveyor, receptacle or the like (not shown), for example for further processing, disposal or for other use.

When a predetermied length of filter paper has passed through the apparatus, that is, after the motor 44 has drawn a length equal to or preferably just slightly longer than the longitudinal distances between rims 121 of cover 120 through the apparatus, the transport motor 44 is stopped and a new length of paper filter web 28 has been presented to the apparatus, and is placed on the perforated plate 14. Motor 5 is then operated in reverse direction to drop the cam 6 to the position shown in FIG. 1, so that the filter cover 120 will again be placed on the web 28, and the cycle can repeat.

The entire method of first evacuating the filter chambers, then introducing liquid to be filtered, filtering the liquid, breaking the vacuum, and removal of used filter web, filter cake thereon, and start of a new production cycle can be automatically controlled by automatic sequencing, coupled with sensing of vacuum by the sensor or transducer 17. Thus, completely automatic operation can be controlled. If it desired to introduce not only sealing liquid from tank 55 into groove 28' but additionally to provide a protective gas, valve 58 can be controlled together with pump 7 or, for example, to start upon opening of valve 8 and to stop upon opening of valve 32, by providing suitable interlock switches in control unit C, so that protective gas is admitted to the filtrate chamber 13 as soon as filtrate can be derived and until the suction of filtrate is terminated and air is introduced above the filter cake to dry the same. Pump 7, preferably, is controlled to operate already upon first starting of the cycle to provide liquid to the web 28 in the region of the engaging rims 121, 112 of the cover 120 and the support plate 12, respectively.

Various changes and modifications may be made within the scope of the inventive concept.

I claim:

1. In a travelling sheet, flat-bed filter apparatus to filter contaminated liquid from a contaminant supply (26') and deliver filtered fluid to a filtered fluid outlet (50') having a web of filter medium (28);

a perforate support plate (14) to support the filter medium thereon;

cover means (120) located above the support plate (14) and forming therewith a contaminant chamber (20) which is in communication with the contaminant supply (26');

a collecting pan including a bottom support plate (12) located beneath the support plate (14), having upstanding supporting rim portions (112), and forming with the filter medium (28) on the support plate a filtrate chamber (13);

a filtered fluid connection (50) in fluid communication with the filtrate chamber (13) and the filtered fluid outlet (50');

a pump (22) connected in the filtered fluid connection (50);

and transport means (42, 44) in engagement with the filter medium and transporting the filter medium over the support plate (14) and between the contaminant chamber (20) and the filtrate chamber (13);

the improvement comprising said cover means being a hood or cap-shaped element (20) positioned by gravity over said support plate (14) and having fixed depending rim portions (121) which are located to directly engage the web of the filter medium (28) only, said filter medium being positioned between the depending rim portions (121) of the cover means (120) and the upstanding rim portions (112) of the support plate (12);

said pump means comprising a suction-and-vacuum pump means (22) in operation generating sufficient vacuum in both the filtrate chamber (13) and the contaminant chamber (20) to draw said hood or cap-shaped element (120) into sealing engagement with the upper surface of the filter medium (28), the ambient atmospheric pressure at the outside of the hood or cap-shaped element pressing said hood or cap-shaped element on the filter medium (28) and against the upstanding supporting rim portions;

means (17) sensing the vacuum in the contaminant chamber (20);

and valve means (8') interposed in the liquid supply and controllable in dependence on the vacuum sensed by the vacuum sensing means, and operative to inhibit supply of contaminated fluid to the contaminant chamber (20) until the vacuum, upon operation of the suction-and-vacuum pump means, has reached a predetermined level indicative of sealing engagement of the rim portions of the cover means and the collecting pan, respectively, with the filter medium interposed, and then controlling said valve means to open to admit contaminated liquid for conjoint continued application of suction by said pump means to effect said sealing engagement, draw contaminated liquid from said contaminant supply, and thus provide for supply of contaminated liquid to the contaminant chamber (20), sucking fluid through the filter medium (28), removing the filtered fluid out from the filtrate chamber (13) while continuing to maintain the sealing vacuum beneath the hood or cap-shaped cover means.

2. Apparatus according to claim 1, including
a plurality of support elements (18) projecting inwardly of the filtrate chamber (13) from the bottom plate (12);
and wherein the support plate (14) comprises a perforate sheet metal plate-like element supported on the support elements and spaced from the bottom plate (12), said filter medium (28) being positioned and supported on said sheet metal plate-like element (14).

3. Apparatus according to claim 1, further comprising a vent line (30) connected to the contaminant chamber (20);
a vent valve (32) in said vent line;
and means (C) operative in dependence on sensed vacuum as sensed by the said vacuum sensing means (17) selectively controlling said vent valve as a function of sensed vacuum.

4. Apparatus according to claim 3, further including air flow sensing means (33; 16, 34) sensing flow of air through said vent valve (32) upon opening thereof and upon continued operation of said pump means (22) to determined condiiton of a filter cake collected on said filter medium as a function of said air flow.

5. Apparatus according to claim 1, further including a holding tank (55) connected to the outlet of said pump means (22) and
storing a predetermined quantity of filtrate pumped by said pump means at an elevated level with respect to the position of said pump means;
and a feedback connecting line (19) from said temporary storage and holding tank (55) to the inlet of the vacuum pump means (22) to provide for supply, by gravity, of filtered fluid to said means and prevent dry running thereof when said pump means is operating as a vacuum pump.

6. Apparatus according to claim 1, further comprising an interconnection line (10, 10') connecting the contaminant chamber (20) and the filtrate chamber (13);
a controlled pressure equalization valve (9) in the interconnection line;
and means (C) controlling said valve to open in response to a predetermined pressure in the contaminant chamber.

7. Apparatus according to claim 1, wherein the rim portion of the bottom plate is formed with a circumferential groove (28'), the groove being positioned beneath, and in alignment with, the rim portion (121) of the hood or cap-shaped element (120);
and fluid duct means (15) establishing fluid communication with said groove.

8. Apparatus according to claim 7, including a connection (7, 8) to said fluid duct means (15) in communication with said groove (28') to the filtered fluid connection (50) to introduce filtered fluid at the engagement region of said rims, with the filter medium interposed, and provide a sealing fluid preventing ingress of air into the contaminant chamber (20) and the filtrate chamber (13).

9. Apparatus according to claim 7, for use as a protected gas or protected atmosphere filter to protect the interior of the filter chamber from contact with ambient air, comprising a source of protective gas (2), said fluid duct means (15) being connected to said source of protective gas to supply protective gas to the filter chamber (13),
leakage of said gas at the junction of the rim portions, with said filter medium (28) interposed, introducing said protective gas into the contaminant chamber (20) and the filtrate chamber (13) while preventing ingress of ambient air.

10. Method to operate a travelling sheet, flat-bed filter apparatus to filter contaminated liquid from a contaminant supply (26') and deliver filtered fluid to a filtered fluid outlet (50') and utlizing an apparatus having
a web or filter medium (28);
a perforate support plate (14) to support the filter medium thereon;
cover means (120) located above the support plate (14) and forming therewith a contaminant chamber (20) which is in communication with the contaminant supply (26');
a collecting pan including a bottom support plate (12) located beneath the support plate (14), having upstanding supporting rim portions (112) and forming with the filter medium (28) on the support plate a filtrate chamber (13);
a filtered fluid connection (50) in fluid communication with the filtrate chamber (13) and the filtered fluid outlet (50');
a suction-and-vacuum pump (22) in the filtering fluid connection (50); and transport means in engagement with the filter medium and transporting the filter medium over the support plate (14) between the contaminant chamber (20) and the filtrate chamber (13);
said method comprising the steps of
positioning said cover means, by gravity, over the support plate (14) with depending rim portions (121) thereof in direct engagement with the upper surface of the web of filter medium, and fitting against, and in alignment with, the upstanding rim portions (112) of the collecting pan;

inhibiting flow of contaminated liquid to the contaminant chamber;

starting said suction-and-vacuum pump, and creating a vacuum within said chambers, to draw the cover means, with the filter medium interposed, against the collecting pan, and tightly and sealingly engage said rim portions;

admitting contaminated liquid when a predetermined vacuum, indicative of sealing engagement of said rim portions, has been sensed;

continuing operation of said pump to continue to effect said sealing engagement, draw contaminated liquid from the contaminant supply, and provide supply of contaminated liquid into the contaminant chamber, suck fluid through the filter medium and remove filtered fluid from the filtrate chamber to the filtered fluid outlet.

11. Method according to claim 10, further comprising the step of sensing the vacuum within the contaminant chamber prior to the step of admitting contaminated liquid to the containment chamber;

and admitting contaminant fluid as a function of and controlled by a sensed predetermined level of vaccum.

12. Method according to claim 10, further including the step of continuing to sense and determine vacuum within the contaminant chamber; and interrupting supply of contaminated fluid to the contaminant chamber when a predetermined level of operating vacuum is sensed, indicative of build-up of filter cake on the filter medium (28).

13. Method according to claim 12, further including the step of admitting drying air to the contaminant chamber as a function of and after the predetermined operating vacuum has been sensed;

sensing air flow to the contaminant chamber to determine the drying condition of the filter cake after exposure to air flow, upon continued operation of the vacuum pump;

and opening said cover means, transporting the filter medium from beneath the cover means, stripping filter cake from used filter medium and resupplying new filter medium to the region between the cover means after the air flow to the cover means has changed to a level indicative that the filter cake has reached a predetermined dry-condition.

14. Method according to claim 10, further including the step of introducing a sealing fluid in the region between said depending rim (121) of the cover means (120) and the upstanding rim (112) of the support pan (12).

15. Method according to claim 14, wherein the step of introducing the sealing fluid comprises introducing filtered liquid from the filtrate outlet against the surface of the filter web medium (28) facing the filtrate chamber in the region of, and covered by, said rims (112, 121).

* * * * *